US012570121B2

(12) United States Patent
Ogaki

(10) Patent No.: US 12,570,121 B2
(45) Date of Patent: Mar. 10, 2026

(54) VEHICLE

(71) Applicant: HONDA MOTOR CO., LTD., Tokyo (JP)

(72) Inventor: Toru Ogaki, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 637 days.

(21) Appl. No.: 18/098,977

(22) Filed: Jan. 19, 2023

(65) Prior Publication Data

US 2023/0234419 A1 Jul. 27, 2023

(30) Foreign Application Priority Data

Jan. 21, 2022 (JP) ................................. 2022-007793

(51) Int. Cl.
| *H02J 7/00* | (2006.01) |
| *B60H 1/00* | (2006.01) |
| *B60L 53/60* | (2019.01) |
| *B60L 58/26* | (2019.01) |
| *H02J 7/14* | (2006.01) |

(52) U.S. Cl.
CPC .......... *B60H 1/00278* (2013.01); *B60L 53/60* (2019.02); *B60L 58/26* (2019.02)

(58) Field of Classification Search
CPC ........ B60L 53/30; B60L 53/302; B60L 53/60; B60L 53/62; B60L 53/63; B60H 1/00278; B60H 1/00285; B60H 1/00292
USPC ....................................................... 320/132
See application file for complete search history.

(56) References Cited

U.S. PATENT DOCUMENTS

| 9,308,800 B2 * | 4/2016 | Kim ................... B60H 1/00978 |
| 2011/0032110 A1 * | 2/2011 | Taguchi .................... B60L 3/12 |
| | | 340/636.1 |
| 2011/0246252 A1 * | 10/2011 | Uesugi .................. G06Q 10/10 |
| | | 705/7.12 |
| 2012/0233077 A1 * | 9/2012 | Tate, Jr. ................ G06Q 10/20 |
| | | 705/65 |
| 2015/0053370 A1 * | 2/2015 | Kikuchi ............. B60H 1/00778 |
| | | 165/11.1 |

(Continued)

FOREIGN PATENT DOCUMENTS

| CN | 105392661 A | 3/2016 |
| CN | 112996689 A | 6/2021 |

(Continued)

OTHER PUBLICATIONS

Jan. 23, 2026, Translation of Chinese Office Action issued for related CN Application No. 202310084528.0.

*Primary Examiner* — Alexis B Pacheco
(74) *Attorney, Agent, or Firm* — Paratus Law Group, PLLC

(57) ABSTRACT

A control device notifies a destination arrival time based on a required charging time in a state where the air conditioning device is operated when charging is included in a scheduled travel plan. Before the charging is executed, the control device makes a proposal for permission to restrict use of the air conditioning device during the charging. When the proposal is approved, the control device changes the destination arrival time based on a required charging time in a state where the use of the air conditioning device is restricted, and notifies the destination arrival time.

8 Claims, 7 Drawing Sheets

(56) References Cited

U.S. PATENT DOCUMENTS

| | | | | |
|---|---|---|---|---|
| 2015/0149221 A1* | 5/2015 | Tremblay | ............... | B60L 53/665 |
| | | | | 320/109 |
| 2015/0165869 A1* | 6/2015 | Kim | ................... | B60H 1/00885 |
| | | | | 701/36 |
| 2016/0031289 A1 | 2/2016 | Murata et al. | | |
| 2016/0121735 A1* | 5/2016 | Sugano | ................... | H02J 7/342 |
| | | | | 320/109 |
| 2021/0086646 A1* | 3/2021 | Prasad | ................... | H02J 7/0045 |
| 2021/0354591 A1* | 11/2021 | Iida | ......................... | B60L 53/66 |
| 2022/0108248 A1* | 4/2022 | Oobayashi | ............... | B60L 53/64 |
| 2023/0234419 A1* | 7/2023 | Ogaki | ..................... | B60L 58/14 |
| | | | | 320/109 |

FOREIGN PATENT DOCUMENTS

| | | | |
|---|---|---|---|
| JP | H07-046701 A | 2/1995 |
| JP | 2006-112932 A | 4/2006 |
| JP | 2019-182135 A | 10/2019 |
| JP | 2021-195059 A | 12/2021 |

* cited by examiner

ARE YOU IN A HURRY?

THE REQUIRED TIME FOR RAPID CHARGING WILL BE
SHORTENED BY RESTRICTING THE USE OF THE AIR CONDITIONER
DURING CHARGING.

| PERMIT | NOT PERMIT |

FIG. 6

| | SECTION | REQUIRED TIME |
|---|---|---|
| 1 | TRAVEL: FROM CURRENT POSITION TO POINT C | 30 MINUTES |
| 2 | CHARGING: POINT C | 15 MINUTES |
| 3 | TRAVEL: FROM POINT C TO POINT D | 60 MINUTES |
| TOTAL | 250 KM | 105 MINUTES |

*FIG. 8*

<sub>174</sub>

THE OPERATION OF THE AIR CONDITIONER IS BEING RESTRICTED.

SINCE COOLING OF THE BATTERY IS PRIORITIZED, THE OPERATION OF THE AIR CONDITIONER IS BEING RESTRICTED.

| O K | AIR CONDITIONER PRIORITY |

*FIG. 9*

|  | SECTION | REQUIRED TIME |
|---|---|---|
| 1 | TRAVEL:   FROM CURRENT POSITION TO POINT C |  |
| 2 | CHARGING: POINT C | <u>20 MINUTES</u> |
| 3 | TRAVEL:   FROM POINT C TO POINT D | 60 MINUTES |
| TOTAL | 250 KM | 80 MINUTES |

VEHICLE

CROSS-REFERENCE TO RELATED APPLICATIONS

This application is based on and claims priority under 35 USC 119 from Japanese Patent Application No. 2022-007793 filed on Jan. 21, 2022.

TECHNICAL FIELD

The present disclosure relates to a vehicle equipped with a battery.

BACKGROUND ART

In recent years, as a specific measure against climate variation of the earth, efforts to realize a low-carbon society or a decarbonized society have been actively made. In vehicles, a reduction in $CO_2$ emission amount is strongly required, and a driving source is rapidly electrified. Specifically, a vehicle such as an electrical vehicle or a hybrid electrical vehicle has been developed which includes an electric motor as a driving source of the vehicle, and a battery as a secondary battery which can supply electric power to the electric motor.

In such a vehicle, normal charging in which a battery is charged by being connected to an external power supply or rapid charging in which a current larger than that in the normal charging flows through the battery to charge the battery can be performed (for example, JP-A-1107-046701 and JP-A-2006-112932). Since the battery generates heat at the time of charging and discharging, it is necessary to appropriately cool the battery. In particular, the battery is likely to generate heat during rapid charging. When the battery generates heat at a temperature equal to or higher than a predetermined temperature, an output of the battery is restricted from the viewpoint of safety.

On the other hand, an air conditioning device (so-called air conditioner) is mounted in a vehicle in order to make an occupant comfortable in the vehicle. Since the air conditioning device requires a relatively large amount of electric power, when the air conditioning device is operating during charging, the battery may not be appropriately cooled and it may take extra time to charge the battery. In particular, in a vehicle including a cooling device in which a refrigerant in a cooling circuit (refrigeration cycle) for an air conditioning device and a refrigerant in a cooling circuit for cooling a battery can exchange heat in a heat exchanger, the cooling performance is restricted, so that there is room for consideration as to how to balance the time required to charge the battery and the use of the air conditioning device.

Further, the time required to charge the battery and the use of the air conditioning device are preferably determined based on an intention of an occupant, and uniform determination made by a vehicle side may impair convenience of the vehicle.

SUMMARY

The present disclosure is to provide a vehicle capable of balancing a time required to charge a battery and use of an air conditioning device without impairing the convenience.

According to an aspect of present disclosure, there is provided a vehicle including: a battery configured to store electric power from an external power supply; a cooling device including a battery cooling device configured to cool the battery, an air conditioning device configured to adjust a temperature inside a vehicle cabin, and a heat exchange unit configured to exchange heat between a refrigerant of the battery cooling device and a refrigerant of the air conditioning device; and a control device configured to control the cooling device, charging of the battery, and a battery temperature, in which: the control device notifies a destination arrival time based on a required charging time in a state where the air conditioning device is operated when charging is included in a scheduled travel plan; before the charging is executed, the control device makes a proposal for permission to restrict use of the air conditioning device during the charging; and when the proposal is approved, the control device changes the destination arrival time based on a required charging time in a state where the use of the air conditioning device is restricted, and notifies the destination arrival time.

According to the present disclosure, the time required to charge the battery and the use of the air conditioning device can be balanced without impairing the convenience of the vehicle.

BRIEF DESCRIPTION OF DRAWINGS

FIG. 5 is a diagram illustrating an example of a proposal displayed on the display unit 174 in an air conditioner use restriction proposal control.

FIG. 6 is a diagram illustrating a graph including the required times changed due to air conditioner use restriction.

FIG. 8 is a diagram illustrating an example of a notification displayed on the display unit 174 in an air conditioner use reconfirmation control.

FIG. 9 is a diagram illustrating a graph including the required time changed by releasing an air conditioner use restriction.

DESCRIPTION OF EMBODIMENTS

Hereinafter, an embodiment of a vehicle of the present disclosure will be described with reference to the accompanying drawings.

[Vehicle]

Figure 1:
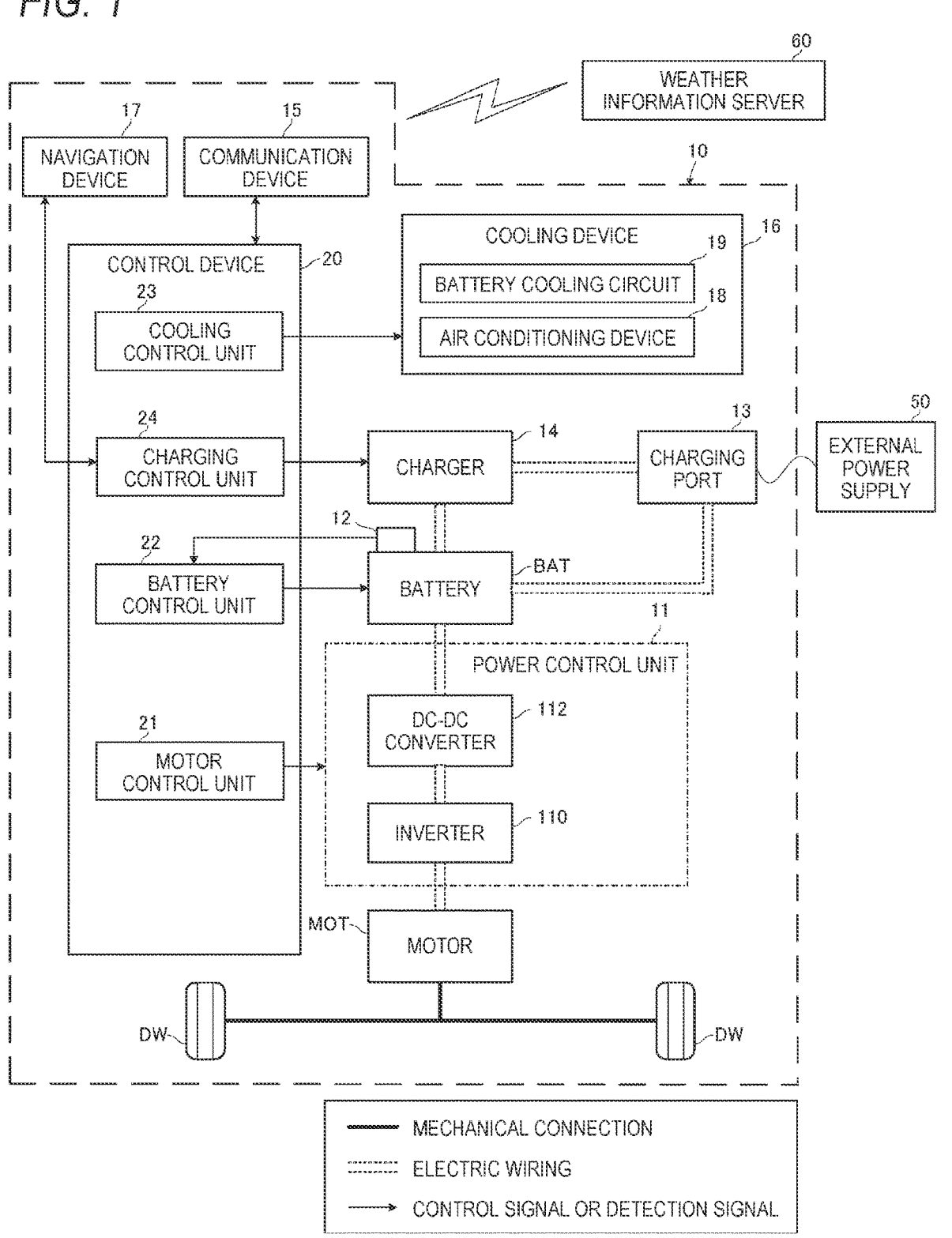
FIG. 1 is a diagram illustrating a configuration of a vehicle 10.

FIG. 1 is a diagram illustrating a configuration of a vehicle 10. As illustrated in FIG. 1, the vehicle 10 includes, for example, a motor MOT, driving wheels DW, a power control unit 11, a battery BAT, a battery sensor 12, a charging port 13, a charger 14, a communication device 15, a cooling device 16, a navigation device 17, and a control device 20. In FIG. 1, a thick solid line indicates mechanical connection, a double dotted line indicates electric wiring, and a thin solid line arrow indicates a control signal or a detection signal. The control signal or the detection signal is transmitted through such as a serial communication line, a wireless communication network, or a multiplex communication line such as a controller area network (CAN) communication line. The configuration illustrated in FIG. 1 is an example, and a part of the configuration may be omitted or another configuration may be added.

The motor MOT is, for example, a three-phase alternating current motor. An output of the motor MOT is transmitted to the driving wheels DW, and power is generated using kinetic energy of the vehicle during deceleration of the vehicle.

The power control unit 11 includes, for example, an inverter 110 and a DC-DC converter 112. The DC-DC converter 112 steps up the electric power supplied from the battery BAT and outputs the stepped-up electric power to the inverter 110, and steps down the electric power supplied from the inverter 110 and outputs the stepped-down electric power to the battery BAT. The inverter 110 converts a direct current supplied from the DC-DC converter 112 into an alternating current and outputs the alternating current to the motor MOT, and converts an alternating current generated by the motor MOT into a direct current and outputs the direct current to the DC-DC converter 112.

The battery BAT is, for example, a secondary battery such as a lithium ion battery. The battery BAT is charged with electric power introduced from an external power supply 50 outside the vehicle 10, for example, a quick charger. The battery BAT mainly supplies electric power to the motor MOT. Examples of the battery sensor 12 include a voltage sensor, a current sensor, or a temperature sensor. The voltage sensor, the current sensor, and the temperature sensor detect a current value, a voltage value, and a temperature of the battery BAT, respectively. The battery sensor 12 outputs the detected current value, voltage value, temperature, or the like to the control device 20.

The charging port 13 is connected (plugged) to the external power supply 50 via a charging cable. The connection between the vehicle 10 and the external power supply 50 is not limited thereto. For example, the vehicle 10 may be provided with a power receiving coil or the like which can contactlessly receive electric power transmitted from the external power supply 50.

The charger 14 is provided between the battery BAT and the charging port 13. The charger 14 converts a current introduced from the external power supply 50 via the charging port 13, for example, an alternating current at the time of normal charging, into a direct current. The charger 14 outputs the converted direct current to the battery BAT.

The communication device 15 includes a wireless module for connecting a cellular network or a Wi-Fi network. The communication device 15 communicates with a weather information server 60 or the like via a network NW, for example, the Internet or the Ethernet.

[Cooling Device]

Figure 2:
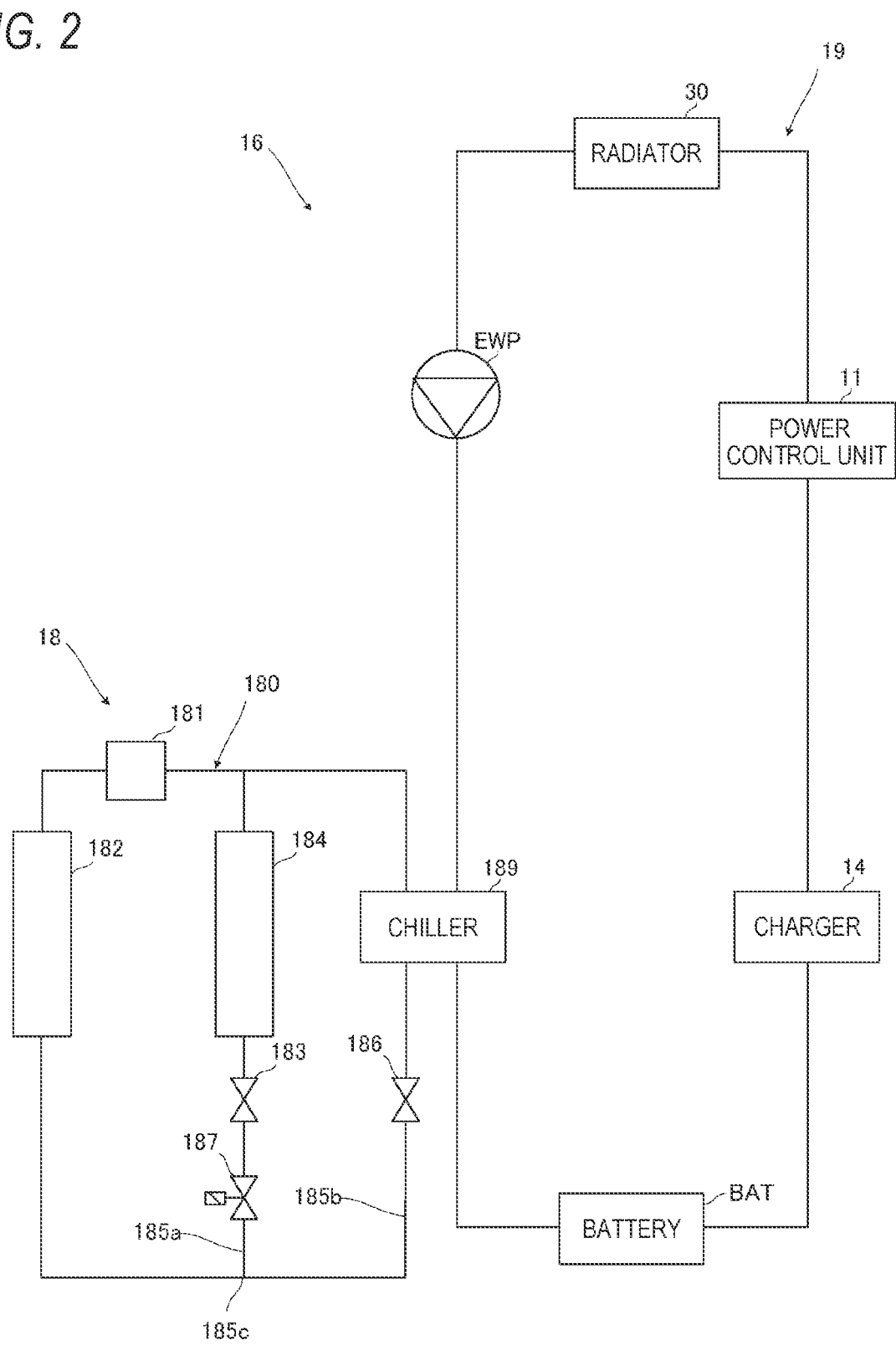
FIG. 2 is a diagram illustrating a configuration of a cooling device 16.

As illustrated in FIG. 2, the cooling device 16 includes an air conditioning device (air conditioner) 18 and a battery cooling circuit 19. Hereinafter, the air conditioning device 18 is referred to as the air conditioner 18. A refrigeration cycle 180 is formed in the air conditioner 18, and the air conditioner 18 adjusts environment in a vehicle cabin by adjusting a state of air in the vehicle cabin. An operation of the air conditioner 18 is controlled by a cooling control unit 23, which will be described later, which receives an operation of an occupant (hereinafter, also referred to as a user). The battery cooling circuit 19 cools the battery BAT, the charger 14, and the power control unit 11 by causing a refrigerant to flow through a refrigerant flow path. A heater may be provided in the battery cooling circuit 19 to heat the battery BAT. An operation of the battery cooling circuit 19 is controlled by the cooling control unit 23 to be described later such that a temperature of the battery BAT is maintained within a predetermined range. In the cooling device 16, the refrigeration cycle 180 of the air conditioner 18 and the battery cooling circuit 19 are configured such that the refrigerants can exchange heat with each other via a chiller 189.

More specifically, with reference to FIG. 2, a compressor 181, a condenser 182, an expansion valve 183, and an evaporator 184 are disposed in series in the refrigeration cycle 180 of the air conditioner 18, and a second flow path 185b in which another expansion valve 186 and the chiller 189 are disposed is provided in parallel with a first flow path 185a in which the expansion valve 183 and the evaporator 184 are disposed. Further, a shutoff valve 187 is provided between the expansion valve 183 and a branch portion 185c of the first flow path 185a and the second flow path 185b, and the refrigerant flows to both the first flow path 185a and the second flow path 185b by setting the shutoff valve 187 to an ON state, and the refrigerant flows only to the second flow path 185b by setting the shutoff valve 187 to an OFF state.

In the battery cooling circuit 19, a pump EVP for supplying the refrigerant, the chiller 189, the battery BAT, the charger 14, the power control unit 11, and a radiator 30 are connected in series.

In the chiller 189, heat exchange is performed between the refrigerant in the refrigeration cycle 180 and the refrigerant in the battery cooling circuit 19. Therefore, in the cooling device 16, a cooling capacity of the refrigeration cycle 180 of the air conditioner 18 is distributed for the air conditioner and for battery cooling. That is, when the air conditioner 18 is not used (air conditioner OFF), the shutoff valve 187 is in the OFF state, and all the cooling capacity of the refrigeration cycle 180 can be used for the battery cooling. On the other hand, when the air conditioner 18 is used (air conditioner ON), the shutoff valve 187 is in the ON state, and the cooling capacity which can be used for the battery cooling among the cooling capacity of the refrigeration cycle 180 is reduced by an amount distributed for the air conditioner. Therefore, among the cooling capacity of the refrigeration cycle 180, the cooling capacity which can be used for the battery cooling depends on ON/OFF of the air conditioner 18.

[Navigation Device]

Figure 3:
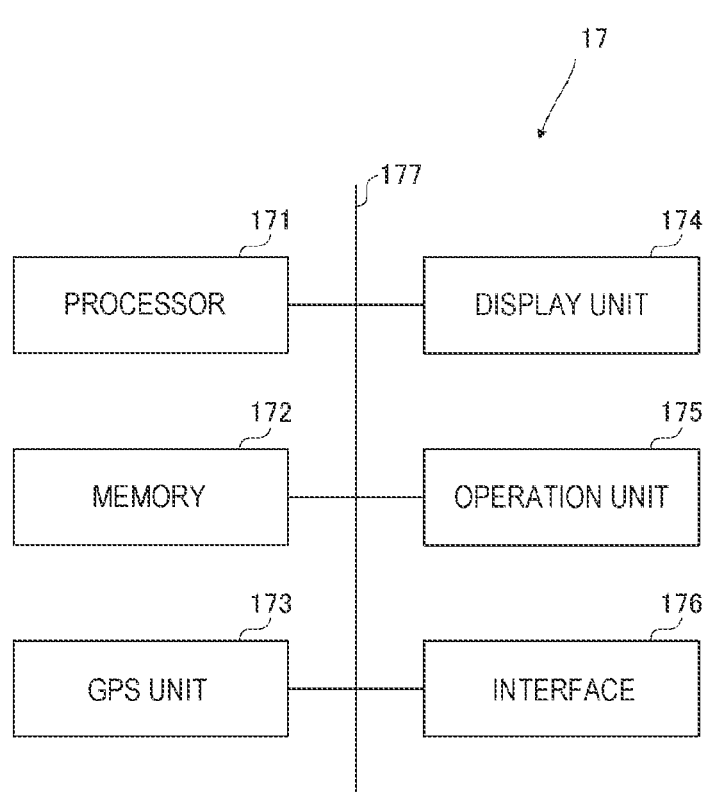
FIG. 3 is a diagram illustrating a configuration of a navigation device 17.

Next, an example of a configuration of the navigation device 17 will be described with reference to FIG. 3. As illustrated in FIG. 3, the navigation device 17 includes a processor 171, a memory 172, a GPS unit 173, a display unit 174, an operation unit 175, and an interface 176. The components 171 to 176 are connected to each other via a bus 177.

The processor 171 is, for example, a CPU which controls the entire navigation device 17. The memory 172 includes, for example, a main memory such as a RAM and an auxiliary memory which is a nonvolatile memory such as a flash memory. The main memory is used as a work area of the processor 171. The auxiliary memory stores various programs for operating the navigation device 17. The programs stored in the auxiliary memory is loaded into the main memory and executed by the processor 171.

The auxiliary memory of the navigation device 17 also stores map data used for specifying a current position of the vehicle 10, route guidance to a destination, and the like. Although detailed description is omitted, the map data includes road data representing roads on which the vehicle 10 can move, facility data representing information on each facility, and the like.

The GPS unit 173 receives GPS signals (radio waves) from GPS satellites and measures the current position of the vehicle 10. The current position measured by the GPS unit 173 is used to specify the current position of the vehicle 10.

The display unit 174 includes a display which displays characters and images, a graphic controller which controls the entire display, and a buffer memory such as a video RAM (VRAM) which temporarily records image data of an image to be displayed on the display. The display is, for example, a liquid crystal display or an organic EL display.

The operation unit 175 inputs an operation signal corresponding to an operation received from the user to the inside of the navigation device 17 (for example, the processor 171). The operation unit 175 is, for example, a touch panel. In addition, the operation unit 175 may be a remote controller, a keyboard, a mouse, or the like including a plurality of keys.

The interface 176 controls input and output of data between the navigation device 17 and the outside (for example, a charging control unit 24). The interface 176 is controlled by the processor 171. A part or all of the functions of the navigation device 17 may be implemented by, for example, functions of a terminal device such as a smartphone or a tablet terminal owned by the user of the vehicle 10.

[Control Device]

As illustrated in FIG. 1, the control device 20 includes a motor control unit 21, a battery control unit 22, the cooling control unit 23, and the charging control unit 24. The control device 20 is implemented by an electronic control unit (ECU) including a processor, a memory, an interface, and the like. The motor control unit 21, the battery control unit 22, the cooling control unit 23, and the charging control unit 24 may be configured as separate control devices.

The motor control unit 21 controls the motor MOT based on an operation amount on an accelerator pedal. The battery control unit 22 calculates a state of charge (SOC) of the battery BAT based on an output of the battery sensor 12 attached to the battery BAT. The cooling control unit 23 controls the cooling device 16 based on the output of the battery sensor 12 in order to cool the battery BAT, and controls the air conditioning device 18 according to a user operation. The charging control unit 24 controls the charger 14 during normal charging, and controls charging of the battery BAT by communicating with the external power supply 50 during rapid charging. The charging control unit 24 is configured to communicate with the navigation device 17.

[Air Conditioner Use Restriction Proposal Control]

In the vehicle 10 configured as described above, when the user registers a destination with the navigation device 17, a scheduled travel plan from the current position of the vehicle 10 to the destination is displayed on the display unit 174. The scheduled travel plan includes charging at a charging station CS located on a travel route or near the travel route in consideration of the SOC of the battery BAT. In addition, the required time is displayed on the display unit 174 together with the travel route. The scheduled travel plan may be a plan in which one travel route is displayed, or may be a plan in which one travel route is selected from a plurality of travel routes by the user.

Figure 4:
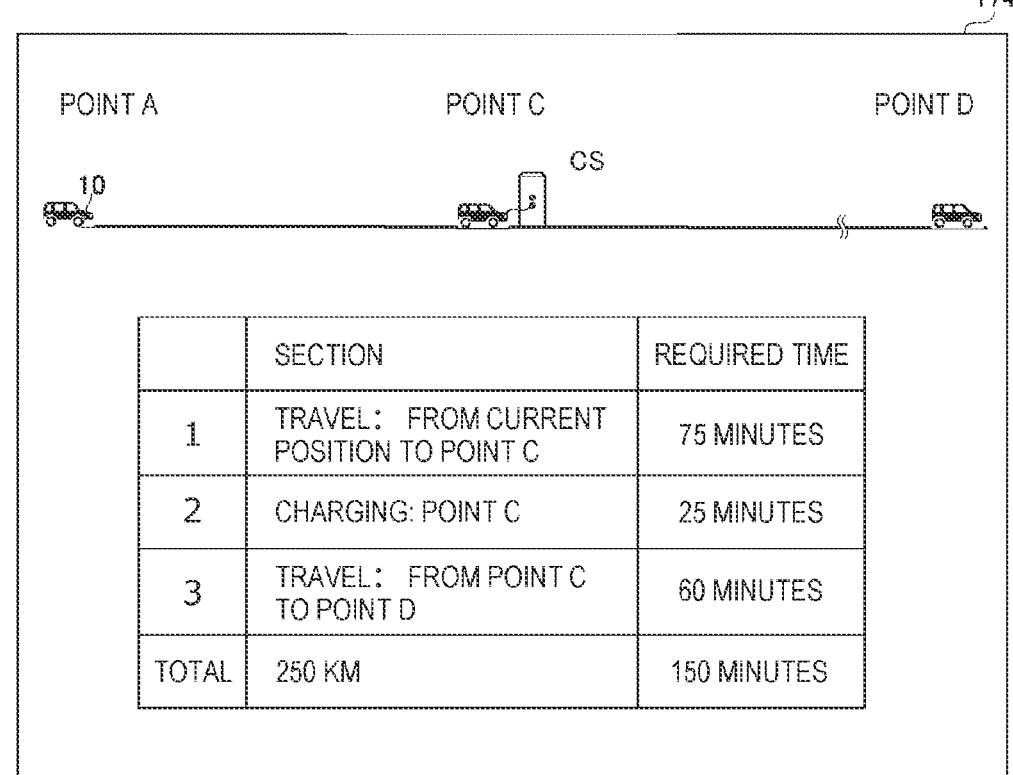
FIG. 4 is a diagram illustrating an example of a display unit 174 on which a scheduled travel plan and a graph including a required time for each section are displayed.

FIG. 4 is a diagram illustrating an example of the display unit 174 on which the scheduled travel plan and a graph including a required time for each scheduled travel section are displayed.

For example, assuming that the current position of the vehicle 10 is a point A and the destination is a point D, the scheduled travel plan includes charging at the charging station CS at a point C between the point A and the point D. Accordingly, the user can drive the vehicle 10 toward the destination (point D) without worrying about the vehicle 10 becoming unable to travel due to low power so-called power shortage). In a case where charging is not necessary before the vehicle 10 travels to the destination, it is needless to say that charging may not be included in the scheduled travel plan.

As illustrated in FIG. 4, a required travel time (75 minutes) from a current location (point A) to the point C where the charging station is located, a required charging time (25 minutes) at the charging station CS, a required travel time (60 minutes) from the point C to the point D which is the destination, a total travel distance (250 km), and a total required time (150 minutes) are displayed on the display unit 174. Therefore, the user can accurately know a destination arrival time including the required charging time. It is sufficient that the contents displayed on the display unit 174 include the travel route to the destination and the required time to arrive the destination, and additional information, layout, and the like may be appropriately changed. The travel route and the required time do not have to be displayed on the same screen, and may be separately displayed by switching the screen.

As the required charging time, a required charging time at the charging station CS on the assumption that the air conditioner 18 is used is displayed. As described above, in the cooling device 16, the cooling capacity of the refrigeration cycle 180 of the air conditioner 18 is distributed for the air conditioner and for the battery cooling, so that the required charging time may vary depending on a use state of the air conditioner 18.

More specifically, as described above, when the battery BAT is charged, the battery BM generates heat. When the battery temperature of the battery BAT becomes equal to or higher than a predetermined temperature (hereinafter, also referred to as an output restriction temperature) due to the heat generation, the output of the battery BAT is restricted from the viewpoint of safety. When the output of the battery BAT is restricted, a current supplied from the external power supply 50 to the battery BAT decreases during charging of the battery BAT. In particular, at the time of rapid charging, since a large current is supplied, the temperature of the battery BAT is likely to rise.

Therefore, in a situation where the cooling performance for cooling the battery is not sufficient due to the use of the air conditioner 18, the battery temperature becomes equal to or higher than the output restriction temperature, the current supplied to the battery BAT is restricted, and accordingly, the required charging time becomes longer. On the other hand, if the battery BAT can be sufficiently cooled by the battery cooling circuit 19 by stopping the air conditioner 18, the output of the battery BAT is not restricted and the required charging time is shortened.

Therefore, when the cooling performance for cooling the battery is equal to or lower than the cooling capacity at which the battery temperature can be maintained at a temperature lower than the output restriction temperature before the charging is executed, the charging control unit 24 transmits, to the navigation device 17, a display instruction for displaying that the required charging time is shortened by restricting the use of the air conditioner 18. Further, the charging control unit 24 transmits, to the navigation device 17, a display instruction for displaying a proposal for permission to stop the air conditioner 18. Therefore, for example, at a point B (not illustrated) located between the point A and the point C, as illustrated in FIG. 5, the display unit 174 displays a proposal that "Are you in a hurry? The required time for rapid charging will be shortened by restricting the use of the air conditioner during charging.". Further, icons of "permit" and "not permit" are displayed on the display unit 174. That is, the charging control unit 24 proposes the user to permit restriction on the use of the air conditioner 18 during charging.

When the user wants to shorten the required charging time, the user can select "permit" to shorten the required time to arrive the destination. In this case, the charging control unit 24 changes the destination arrival time based on the required charging time in a state where the use of the air conditioner 18 is restricted, and displays the destination arrival time on the display unit 174.

FIG. 6 is a diagram illustrating a graph including the required times changed due to the air conditioner use restriction. As illustrated in FIG. 6, the required charging time at the charging station CS is changed and displayed on the display unit 174 (25 minute->15 minutes).

On the other hand, when the user wants to stay in the vehicle and use the air conditioner 18 even during charging, by selecting "not permit", the user can also continue to use the air conditioner 18 in the vehicle during charging although the required charging time cannot be shortened. In this way, the user can shorten the required charging time and the destination arrival time with his/her intention. Since the air conditioner 18 can be continuously used when the user has sufficient time and wants to use the air conditioner 18, the convenience of the vehicle 10 is not reduced.

As described above, the charging control unit 24 determines the necessity of proposal based on the cooling capacity of the air conditioner 18 in the cooling device 16 and the cooling capacity of the battery cooling circuit 19 in the cooling device 16. When the battery BAT can be sufficiently cooled by the battery cooling circuit 19 even if the air conditioner 18 is used, that is, when the battery BAT can be maintained at a temperature lower than the output restriction temperature, it is not necessary to make the above-described proposal.

For example, when a temperature of a region where the charging station is located is low, it may not be necessary to make the above-described proposal. Therefore, it is preferable that the charging control unit 24 acquires weather information from the weather information server 60 via the communication device 15 as illustrated in FIG. 1 and determines the necessity of the proposal based on the weather information. In this manner, when a situation in which the battery temperature is likely to become high is grasped in advance based on the weather information and it is not necessary to restrict the use of the air conditioner 18, the above-described proposal is not made, and thus it is possible to avoid making unnecessary proposals to the user.

Further, when the user selects "permit" in response to the proposal, the charging control unit 24 preferably displays, on the display unit 174, sightseeing guidance such as sightseeing information, restaurant information, and shopping information in the vicinity of the charging station CS. As a result, the user can be guided from the inside of the vehicle where the use of the air conditioner 18 is restricted to the outside of the vehicle, and chances of the user using the air conditioner 18 during charging, which will be described later, can be reduced.

The proposal may be made at the point A, between the point A and the point B, immediately before arrival at the point C, or at the time of arrival at the point C.

Figure 7:
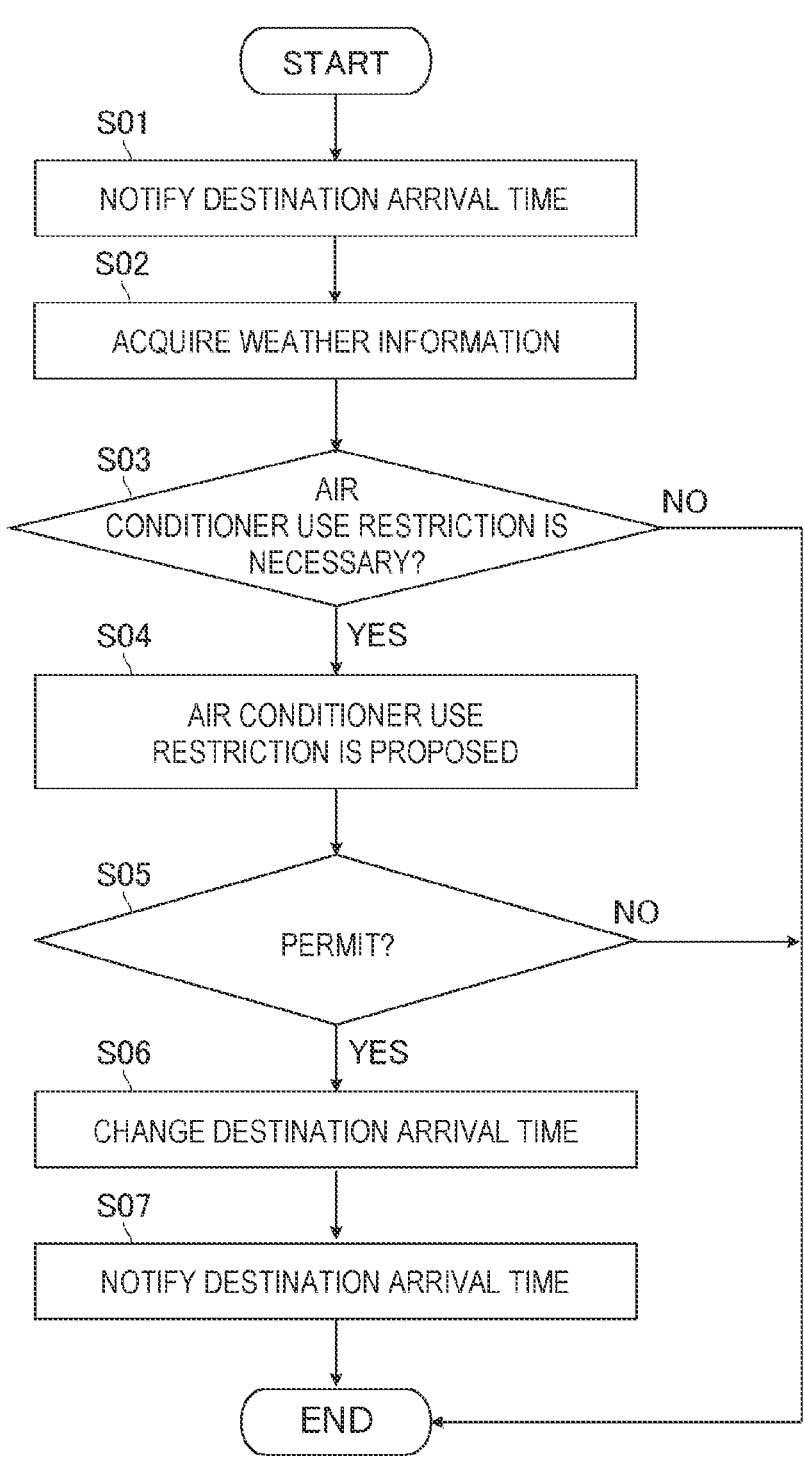
FIG. 7 is a flowchart illustrating a flow of the air conditioner use restriction proposal control.

FIG. 7 is a flowchart illustrating a flow of the air conditioner use restriction proposal control.

The navigation device 17 first notifies the destination arrival time based on the input destination (S01). Subsequently, the charging control unit 24 accesses the weather information server 60 and acquires weather information of a region of the charging station CS at which charging is scheduled (S02). The charging control unit 24 determines whether the use restriction on the air conditioner 18 is necessary based on the acquired weather information (S03). As a result, when the use restriction on the air conditioner 18 is not necessary (NO in S03), the processing ends. When the use restriction on the air conditioner 18 is necessary (YES in S03), the use restriction on the air conditioner 18 is proposed (S04). When the user does not permit the proposal of the use restriction on the air conditioner 18 (NO in S05), the processing ends. On the other hand, when the user permits the proposal of the use restriction on the air conditioner 18 (YES in S05), the charging control unit 24 changes the destination arrival time (S06), and notifies the changed destination arrival time (S07).

[Air Conditioner Use Reconfirmation Control]

Next, the air conditioner use reconfirmation control will be described. The air conditioner use reconfirmation control is a control assuming a case where the user requests to use the air conditioner 18 when the battery BAT is charged in a state where the use of the air conditioner 18 is restricted.

In this case, the charging control unit 24 notifies that the use of the air conditioner 18 being charged is restricted. For example, as illustrated in FIG. 8. "The operation of the air conditioner is being restricted. Since cooling of the battery is prioritized, the operation of the air conditioner is being restricted." is displayed on the display unit 174, and icons of "OK" and "air conditioner priority" are displayed. It is possible to prompt the user to reconsider by calling attention of the user in this way.

When the user wants to use the air conditioner 18, the user can use the air conditioner 18 by selecting "air conditioner priority". In this case, the charging control unit 24 restricts the current supplied to the battery BAT, and transmits, to the navigation device 17, a display instruction for changing and displaying the destination arrival time based on the required charging time in a state where the use of the air conditioner 18 is resumed.

FIG. 9 is a diagram illustrating a graph including the required time changed by releasing the air conditioner user restriction. As illustrated in FIG. 9, the required charging time (15 minutes->20 minutes) at the charging station CS is changed and displayed on the display unit 174. As a result of reconsidering as described above, when the user wants to release the use restriction on the air conditioner 18, the convenience of the vehicle 10 is improved by complying with the intention of the user.

On the other hand, when the user wants to continue the use restriction on the air conditioner 18 in response to the notification, the user selects "OK". As a result, the charging control unit 24 continues to restrict the use of the air conditioner 18.

Figure 10:
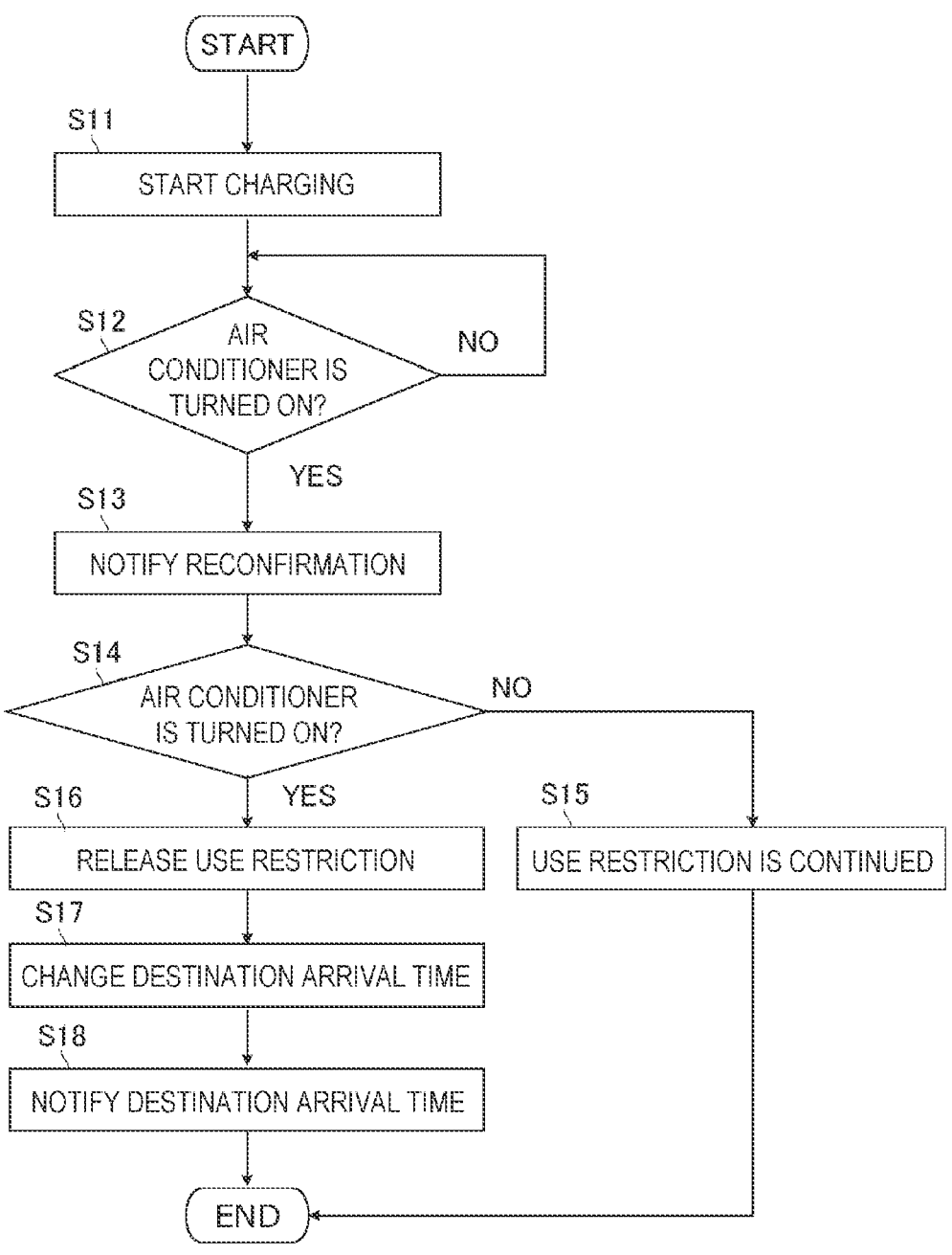
FIG. 10 is a flowchart illustrating a flow of the air conditioner use reconfirmation control.

FIG. 10 is a flowchart illustrating a flow of the air conditioner use reconfirmation control.

First, the charging control unit 24 starts charging when the charging cable is connected to the charging port 13 (S11). The charging control unit 24 monitors whether an intention to use the air conditioner 18 is input during power reception (S12). When the intention to use the air conditioner 18 is not input (NO in S12), the monitoring is continued until the intention to use the air conditioner 18 is input. When the charging is completed, the processing ends. When an intention to use the air conditioner 18 is input (YES in S12), a reconfirmation notification is issued (S13). As a result, when the user does not want to use the air conditioner 18 (NO in S14), the use restriction on the air conditioner 18 is continued (S15). On the other hand, when the user wants to use the air conditioner 18 (YES in S14), the use restriction on the air conditioner 18 is released (S16), the charging control unit 24 changes the destination arrival time (S17), and notifies the changed destination arrival time (S18).

Although embodiments for carrying out the present invention have been described above using the embodiment, the present invention is by no means limited to these embodiments, and various modifications and substitutions can be made without departing from the gist of the present invention.

Further, at least the following matters are described in the present specification. Although the corresponding constituent elements or the like in the above embodiment are shown in parentheses, the present invention is not limited thereto.

(1) A vehicle (vehicle 10) including:

a battery (battery BAT) configured to store electric power from an external power supply (external power supply 50);

a cooling device (cooling device 16) including a battery cooling device (battery cooling circuit 19) configured to cool the battery, an air conditioning device (air conditioning device 18) configured to adjust a temperature inside a vehicle cabin, and a heat exchange unit (chiller 189) configured to exchange heat between a refrigerant of the battery cooling device and a refrigerant of the air conditioning device; and a control device (control device 20) configured to control the cooling device, charging of the battery, and a battery temperature, in which:

the control device notifies a destination arrival time based on a required charging time in a state where the air conditioning device is operated when charging is included in a scheduled travel plan;

before the charging is executed, the control device makes a proposal for permission to restrict use of the air conditioning device during the charging; and when the proposal is approved, the control device changes the destination arrival time based on a required charging time in a state where the use of the air conditioning device is restricted, and notifies the destination arrival time.

According to the above (1), the user can know the destination arrival time more accurately when the destination arrival time including the required charging time is notified. Further, when the user permits the use restriction on the air conditioning device, the destination arrival time is changed based on the shortened required charging time, so that the user can shorten the required charging time and the destination arrival time with his/her intention. Further, since the user can use the air conditioner when the user has sufficient time and wants to use the air conditioner, the convenience of the vehicle is not reduced. Thus, even if the air conditioning device and the battery cooling device are not increased in size, the time required for charging the battery and the use of the air conditioning device can be balanced without impairing the convenience.

(2) The vehicle according to the above (1), in which:

the control device determines necessity to restrict the use of the air conditioning device during the charging;

the control device makes the proposal when it is necessary to restrict the use of the air conditioning device during the charging; and the control device does not make the proposal when it is not necessary to restrict the use of the air conditioning device during the charging.

According to the above (2), since the proposal is not made when it is not necessary to limit the use of the air conditioning device, it is possible to avoid making an unnecessary proposal to the user.

(3) The vehicle according to the above (2), in which:

the control device is configured to acquire weather information; and the control device determines the necessity based on the weather information of an area for executing the charging.

According to the above (3), a situation in which the battery temperature is likely to rise can be grasped in advance.

(4) The vehicle according to the above (3), in which the necessity is determined based on a cooling capacity of the air conditioning device in the cooling device and a cooling capacity of the battery cooling device in the cooling device.

According to the above (4), since the necessity is determined based on the cooling capacity of the battery cooling device, which is obtained by subtracting the cooling capacity used by the air conditioning device from the cooling capacity of the cooling device, the necessity of restricting the use of the air conditioning device can be appropriately determined.

(5) The vehicle according to the above (4), in which:

the control device restricts a charging current when the battery temperature is equal to or higher than a predetermined value, and the control device makes the proposal when the cooling capacity of the battery cooling device in the cooling device is equal to or less than a cooling capacity capable of maintaining the battery temperature below the predetermined value.

According to the above (5), when the battery temperature is equal to or higher than the predetermined value, the charging current is restricted and the required charging time becomes longer, so that by making a proposal for permission to limit the use of the air conditioning device only when the required charging time becomes longer, it is possible to avoid making an unnecessary proposal to the user.

(6) The vehicle according to any one of the above (1) to (5), in which the charging is rapid charging.

According to the above (6), since the battery temperature is likely to rise at the time of rapid charging, it is more effective to perform the control at the time of the rapid charging.

(7) The vehicle according to any one of the above (1) to (6), in which the control device notifies that the use of the air conditioning device is restricted during the charging in a case where an intention to use the air conditioning device is confirmed when the proposal is approved and the charging is being executed.

According to the above (7), it is possible to prompt the user to reconsider by calling attention of the user.

(8) The vehicle according to the above (7), in which:

the control device releases the restriction on the use of the air conditioning device when an intention to use the air conditioning device is further confirmed after the notification, and the control device changes the destination arrival time based on a required charging time in a state where the use of the air conditioning device is not restricted, and notifies the destination arrival time.

According to the above (8), as a result of reconsidering, when the user wants to release the use restriction on the air conditioning device, the convenience of the vehicle is improved by complying with the intention of the user.

What is claimed is:

1. A vehicle comprising:
a battery configured to store electric power from an external power supply;
a cooling device including a battery cooling device configured to cool the battery, an air conditioning device configured to adjust a temperature inside a vehicle cabin, and a heat exchange unit configured to exchange heat between a refrigerant of the battery cooling device and a refrigerant of the air conditioning device; and
a control device configured to control the cooling device, charging of the battery, and a battery temperature, wherein:
the control device notifies a destination arrival time based on a required charging time in a state where the air conditioning device is operated when charging is included in a scheduled travel plan;
before the charging is executed, the control device makes a proposal for permission to restrict use of the air conditioning device during the charging; and
when the proposal is approved, the control device changes the destination arrival time based on a required charging time in a state where the use of the air conditioning device is restricted, and notifies the destination arrival time.

2. The vehicle according to claim 1, wherein:
the control device determines necessity to restrict the use of the air conditioning device during the charging;
the control device makes the proposal when it is necessary to restrict the use of the air conditioning device during the charging, and
the control device does not make the proposal when it is not necessary to restrict the use of the air conditioning device during the charging.

3. The vehicle according to claim 2, wherein:
the control device is configured to acquire weather information; and
the control device determines the necessity based on the weather information of an area for executing the charging.

4. The vehicle according to claim 3, wherein
the necessity is determined based on a cooling capacity of the air conditioning device in the cooling device and a cooling capacity of the battery cooling device in the cooling device.

5. The vehicle according to claim 4, wherein:
the control device restricts a charging current when the battery temperature is equal to or higher than a predetermined value; and
the control device makes the proposal when the cooling capacity of the battery cooling device in the cooling device is equal to or less than a cooling capacity capable of maintaining the battery temperature below the predetermined value.

6. The vehicle according to claim 1, wherein
the charging is rapid charging.

7. The vehicle according to claim 1, wherein
the control device notifies that the use of the air conditioning device is restricted during the charging in a case where an intention to use the air conditioning device is confirmed when the proposal is approved and the charging is being executed.

8. The vehicle according to claim 7, wherein:
the control device releases the restriction on the use of the air conditioning device when an intention to use the air conditioning device is further confirmed after the notification; and
the control device changes the destination arrival time based on a required charging time in a state where the use of the air conditioning device is not restricted, and notifies the destination arrival time.

* * * * *